June 23, 1936.  W. D. GOVE ET AL  2,045,559
SERVOMOTOR MECHANISM
Filed Jan. 31, 1935  3 Sheets-Sheet 1

Inventors
Winfield D. Gove &
John O. Almen
By Blackmore, Jones & Flint
Attorneys

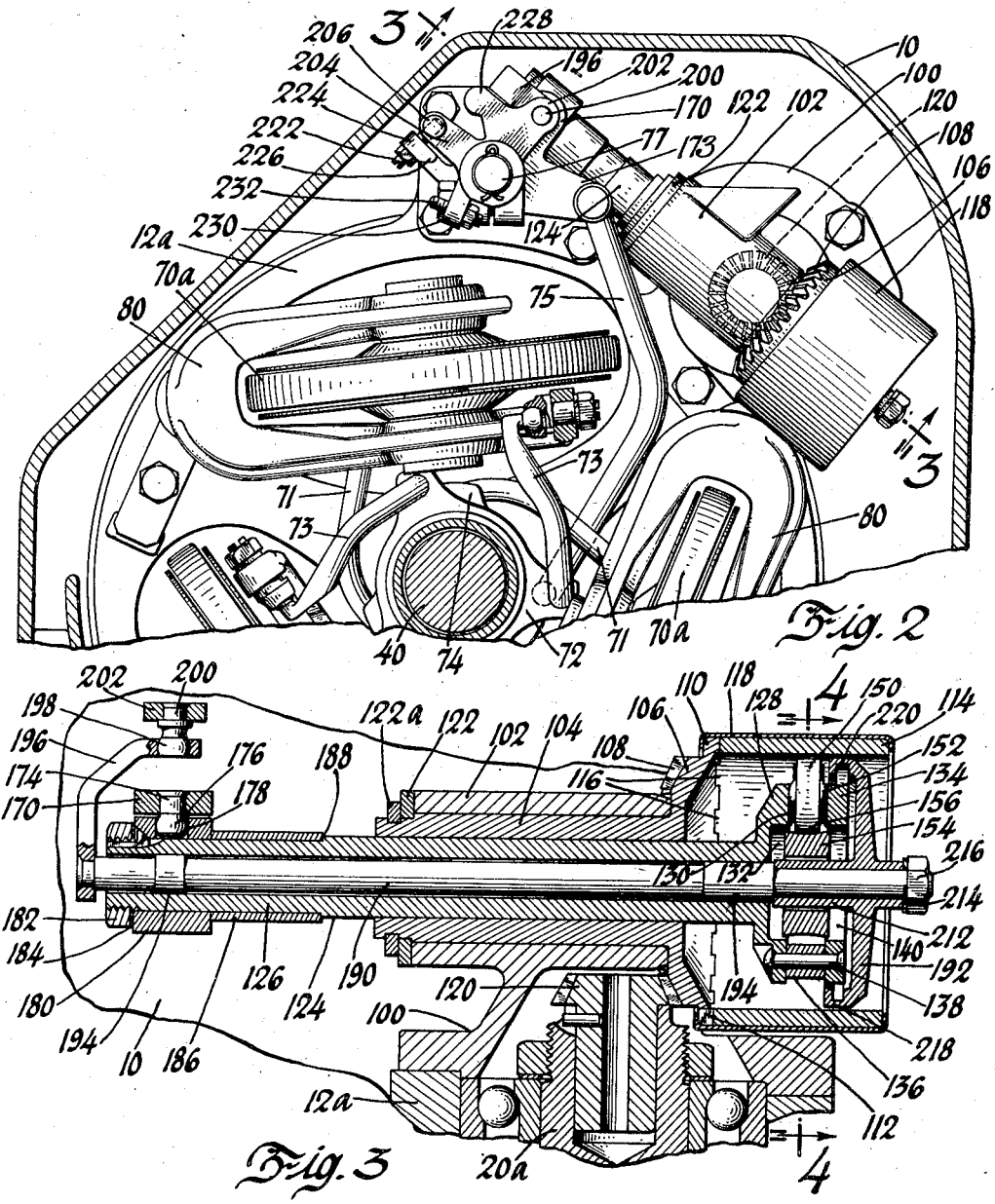

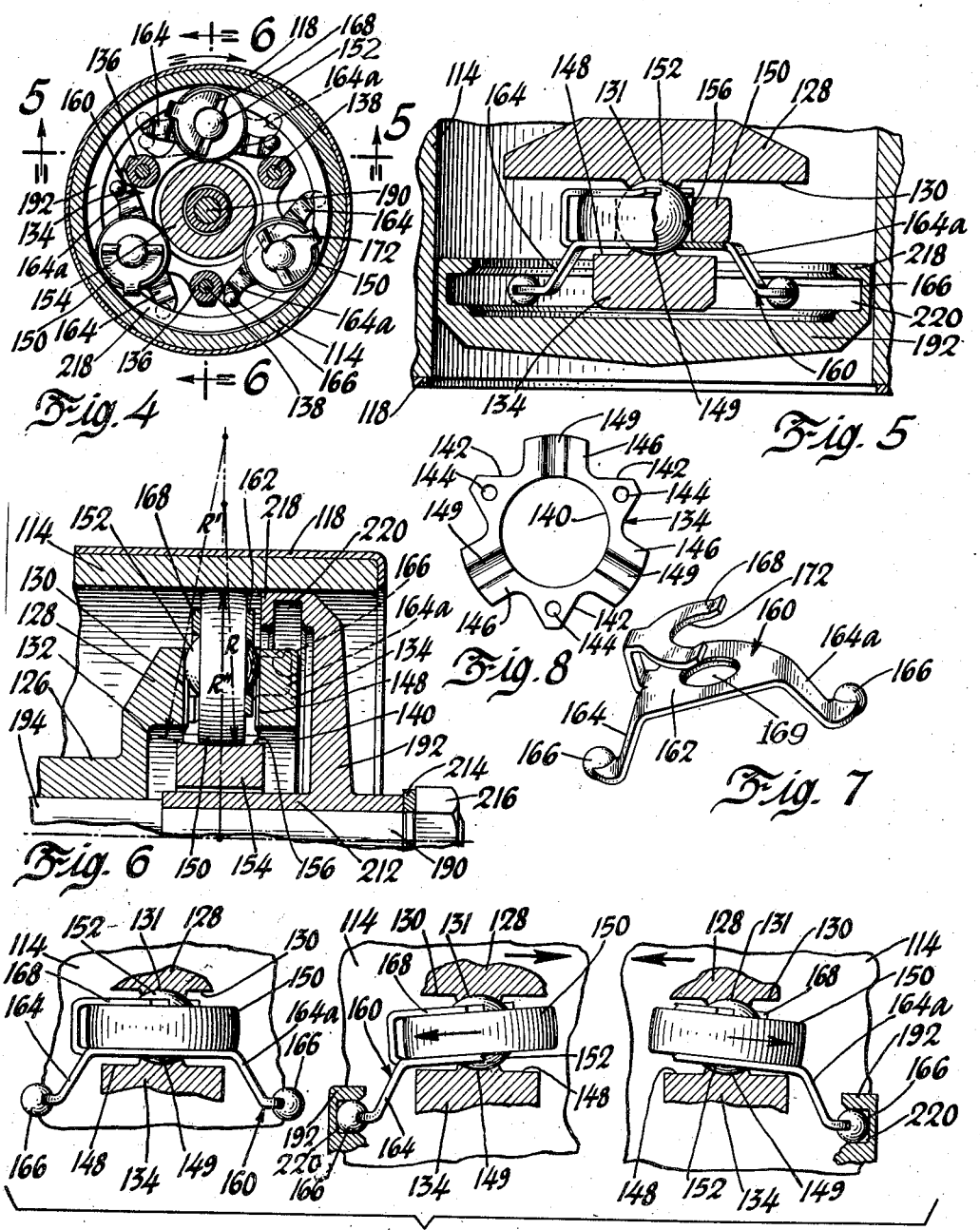

Patented June 23, 1936

2,045,559

UNITED STATES PATENT OFFICE 2,045,559

SERVOMOTOR MECHANISM

Winfield D. Gove, Detroit, and John O. Almen, Royal Oak, Mich., assignors to General Motors Corporation, Detroit, Mich., a corporation of Delaware Application January 31, 1935, Serial No. 4,220

16 Claims. (Cl. 74—200)

This invention relates to servo-motor apparatus and particularly to mechanical servo-motor apparatus adapted to respond accurately to and follow up external control efforts.

Among the several objects of the invention are to secure a high ratio of output force as compared with the effort of control applied to the servo-motor mechanism; to provide a compact, high duty servo-motor mechanism; to minimize lost motion and lag; to provide a race-and-roller servo-motor mechanism that automatically reverses the connection of a control member to the roller when the sense of rotation of the race is reversed, in order to impart to the output member a force in the same sense of direction in response to a given movement of the control member whether the race be rotating in forward or reverse; to render the race and roller mechanism self-loading so as to increase the traction between rollers and races as the load upon the servo-mechanism increases, and otherwise to improve the operation of mechanical servos adapted to follow up with precision the efforts of control.

The objects of the invention are achieved by the combination of a rotatable driven race with rollers, each adapted to be steered in varied paths of travel on the raceway by external control means operative to incline each roller about an axis passing through the roller center and its point of contact with the race, thereby imparting "precessional" movement and/or bodily travel which is utilized to operate a power output member adapted to be connected to means for accomplishing the work desired. In the construction illustrated the race is a rotating cylinder and the rollers are universally mounted in a cage within the cylinder so that the roller peripheries engage the inner periphery or raceway of the cylinder, and preferably also a freely floating central race. The cage is fixedly connected with an output shaft. Means for inclining the rollers in response to external control causes them to tilt about an axis perpendicular to a radial plane including the race axis and the roller center, and also to spiral on the cylinder raceway and thereby move the cage and output shaft in an axial direction. The rollers, in tilting, increase the pressure between races and rollers in proportion to the load on the output member. Restoration of the rollers from an inclined position while spiraling, that is, from positions in which their axes are oblique to the race axis to a position in which their axes are parallel with the race axis, is effected by the connections to the rollers from the device that responds to external control efforts, as will more fully appear in the complete description to follow.

In the drawings, wherein like reference characters indicate like parts throughout the several views, Fig. 1 shows a mechanical servo-motor apparatus according to this invention applied to an infinitely variable speed transmission mechanism for the purpose of changing the position of transmission elements in order to vary the speed ratio;

Fig. 2 is a transverse section through a transmission casing exposing, in elevation, a mechanical servo-motor apparatus according to this invention, with the output shaft of the servo-motor operatively connected to transmission mechanism control parts;

Fig. 3 is a longitudinal section on a plane indicated by the line 3—3 of Fig. 2;

Fig. 4 is a transverse sectional view of larger scale, on a plane indicated by the line 4—4 of Fig. 3;

Fig. 5 is a sectional view of larger scale, on a plane indicated by line 5—5 of Fig. 4;

Fig. 6 is a sectional view on a plane indicated by line 6—6 of Fig. 4;

Fig. 7 is a perspective view of a roller-inclining and restoring device which embraces each of the rollers of the servo-mechanism;

Fig. 8 illustrates in detail a portion of a cage associated with the power output member, for retaining the rollers of the servo mechanism;

Fig. 9 is a diagram showing at the left a roller in a normal position with its axis parallel with the race axis, and at the center and right the same roller in reversed positions of inclination and opposite senses of rotation.

Figure 1:
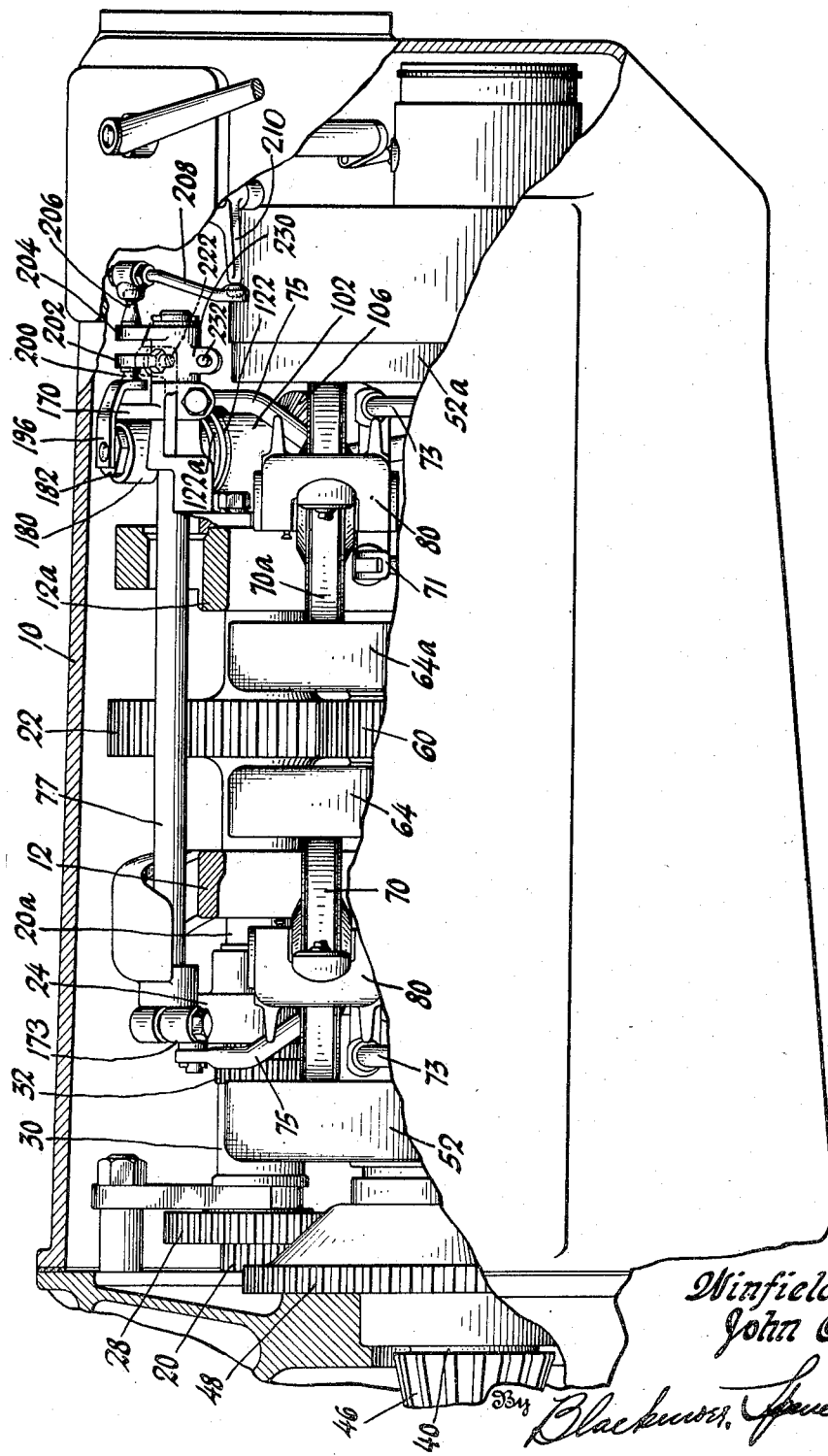

The invention is disclosed in association with a motor vehicle variable-speed friction transmission mechanism of race and roller type for the purpose of illustrating one useful industrial application of it. The invention is, however, of general application to mechanisms wherein servo-motor actuations that exactly follow up the movements of a control device,—starting, operating and stopping, in exact response to manual or other external influence.

In Fig. 1, numeral 10 indicates a casing that houses a duplex race and roller transmission mechanism of a type fully disclosed in a prior application of Almen and Gove, entitled Control for toric friction transmission, filed December 20, 1934, Serial No. 758,394.

A description of the mechanism within the casing, only sufficient to make clear one application of this invention, follows:

Within and rigidly secured to the casing 10 are parallel frame members 12 and 12ª supporting suitable bearings for power input and output shafts and a control shaft. The power input shaft consists of axially alined sections 20, 20ª adapted to be clutched together to rotate as one, or unclutched so that they may rotate as separate members. A gear 22 is secured to input shaft section 20ª and meshes with a mating gear 60 in order to rotate the driving races. Shaft section 20ª carries one element 24 of a jaw clutch, which is adapted to interlock with a mating element 32 on the hub 30 of a reverse gear 28 slidably splined to input shaft section 20. Reverse gear 28 may be slid into engagement with a companion gear 48 on the output shaft 40 in order to drive the latter in reverse; or it may be disengaged from gear 48 and moved into neutral position, as shown in Fig. 1, wherein both forward and reverse drive trains are disconnected; or it may be shifted so as to interlock clutch elements 24 and 32, and thereby connect the forward driving train with the prime mover, such as an engine, not shown. A bevel pinion 46 is secured to the forward end of the output shaft (the left-hand end as viewed in Fig. 1) from which power may be taken to drive, for example, the traction wheels of a vehicle. The output shaft is rotated during forward driving from gear 22 through gear 60, driving races 64, 64ª, driven races 52, 52ª, which are positively connected to the output shaft, and through the intermediate power transmitting rollers 70, 70ª in tractive contact with both driving and driven races. The rollers are mounted in carriers 80, each universally pivoted to a frame member 12, or 12ª, and said carriers may be shifted by control links 71, 73, having their outer ends pivoted to the carriers at opposite sides of the roller axes and their inner ends connected to independently movable control collars 72 and 74 adapted to be actuated by mechanism including master links 75, which are operated by a rocking movement of a control shaft 77, provided with an arm fixed at each end to which links 75 are connected.

The servo-motor mechanism to which this invention particularly relates is shown in Figs. 1 and 2 supported by frame member 12ª, and with the servo-power-output member connected to control shaft 77 so as to rock it, in one sense or the other, in response to an external effort applied to the servo-motor mechanism.

As shown best in Fig. 3, a bracket 100, secured to frame member 12ª, has a supporting and bearing sleeve 102, in which the servo-motor is mounted. A longitudinally bored rotatable member, through which the servo-motor mechanism receives power from input shaft 20ª, is rotatably mounted in and prevented from axial movement by, the supporting and bearing sleeve 102. Said power receiving member consists of a tubular shaft 104 within the bearing sleeve; a flange-like member 106 rigid with the tubular shaft 104, said member 106 having bevel gear teeth 108 and a castellated rim 110 formed with alternating teeth and notches 112; and a hollow or tubular race 114 having an internal raceway and equipped at one end with teeth and notches 116 intercalated with the teeth and notches 112 on the castellated rim 110. Race 114 is bound in coaxial relation to the other parts 104 and 106 of the rotary power receiving member, as by a sheet metal cover 118 surrounding the race and spun down over its ends and over the castellated rim of the member 106. The internal diameter of the cover 118 is a trifle greater than the external diameter of race 114, so that the latter may deform slightly without interference of the cover. A bevel pinion 120 secured to the rear end of input shaft section 20ª meshes with the teeth 108 on the power receiving member of the servo-motor mechanism.

The described power receiving member is held against axial movement within and with respect to the bracket and bearing sleeve 102 by the part 106 at one end (the right hand end as viewed in Fig. 3) which contacts with the adjacent end of sleeve 102, and by a collar 122 that bears against the other end of said sleeve 102, and may be locked in place, as by a snap ring 122ª removably seated in a groove in the tubular part 104 of said power receiving member.

Whenever the clutch elements 24 and 32 are engaged and the prime mover coupled to input shaft section 20, the power receiving member, consisting of parts 104, 106 and 114, are rotating in one sense of rotation; and whenever the reverse gears 28 and 48 are in mesh, during the time shaft 20 is coupled to the prime mover, said power receiving member is rotating in the reverse sense. As, in the exemplary illustration, the input shaft section is assumed to be driven by a motor vehicle engine, the input shaft section 20 is assumed to be rotating clockwise viewed from the front, i. e., the left-hand end of Fig. 1, or counter-clockwise as viewed from the rear as in Fig. 2. Shaft section 20ª therefore will rotate in the same sense when it is coupled to shaft section 20, and reversely when it is disconnected from shaft 20 and reverse gears 28 and 48 are in mesh. In the latter assumed condition, output shaft 40 (carrying gears 46 and 48) rotates clockwise (viewed as in Fig. 2) as do races 52 and 52ª keyed to it; intermediate rollers 70 and 70ª being now rotated by races 52 and 52ª, turn races 64, 64ª and gear 60 counter-clockwise, and gear 60 intermeshed with gear 22 rotates the latter clockwise (all as viewed in Fig. 2, from the rear). It will therefore be apparent that during forward driving of the transmission the power receiving member comprising geared element 106 will be rotating counter-clockwise as viewed from the lower end of the servo-motor mechanism,—that is, from the right of Fig. 3,—and clockwise during rearward driving. And whenever the prime mover is delivering torque to shaft 20 and the transmission is coupled either in forward or reverse, the power receiving member of the servo-motor device is rotating in one sense or the reverse. The rotative movement of the race 114 may be converted into an axial movement, in either sense, of the power output element 124 of the servo-motor by mechanism now to be described.

The servo-motor output element 124 consists of a tubular shaft 126 having an enlarged end part fabricated into a roller guiding cage. Said cage comprises the extended circular flange 128 shown integral with tubular part 126, and having a face 130 generally in a plane perpendicular to the axis of the output element, and a counterbore 132; it also comprises a cage member 134 as a companion for the flange 128, spaced from the latter by tubular spacers 136. Rivets 138 passed through the spacers rigidly unite flange 128 and companion member 134, thus providing spaces within the enlarged end portion of servomotor output member for accommodating the power transmission rollers. Cage member 134 has a perforation or bore 140 of the same diameter as the countersink 132 in flange 128, and coaxial with said countersink when the flange 128 and member 134 are riveted together. Member 75

134, as illustrated in detail in Fig. 8, appears, roughly, as a star-shaped body with six "points" when looked at in the direction of its axis. Three of the "points" 142, equally spaced, are provided with holes 144 to receive the rivets 138. The other three larger radiating "points" 146, have surfaces opposed to and generally parallel with the surface 130 on flange 128. "Points" 146 are disposed 120 degrees apart and are separated 60 degrees from the "points" 142 in the construction illustrated. The radius of member 134 at "points" 146 is equal to the radius of flange 128.

The opposed surfaces of flange 128 and companion star-like member 134 are formed with opposed radial, parti-cylindrical grooves spaced 120° apart. The grooves in one member of the cage are of the same radii struck from the same axis as the opposed grooves in the other member. These grooves are formed in radial lands or elevations in the respective members 128 and 134. The grooves in member 128 are indicated by numeral 131 and those in member 134 by numeral 149. In Fig. 8, the face of member 134 shows the radial grooves on the inner surface of member 134, that is, the surface 148, opposed to surface 130 of member 128.

Power transmission rollers 150 are disposed in the cage-end of output member 124, as shown most clearly in Figs. 3 to 6. Each roller is equipped with two parti-spherical bosses 152, one protruding centrally from each face. The bosses 152 are preferably surfaces of a hard steel ball pressed into a hole formed axially through the roller. The bosses 152 are glided in the parti-cylindrical grooves 131 and 149 of members 128 and 134. They are neatly fitted to the grooved surfaces, which may be of the same radius of curvature. Thus each roller may have three degrees of angular motion and may move radially should distortions of the races permit, but is restrained by the grooves from circumferential or tangential movement with respect to the cage.

Rollers 150, of which there are three equally spaced, are in rolling contact with the internal cylindrical raceway of race 114, and with the raceway 156, of a centrally disposed ring-like, floating race 154. Raceway 156 of floating race 154 may be curved in an axial plane as well as in a plane perpendicular to the axis. The ring-like race 154, is free-floating in any direction; bore 140 in cage member 134 and countersink 132 in cage member or flange 128 afford space for movement of the floating race; and as the central opening therethrough is of greater diameter than the elements encircled by it, said floating race is supported and its position is determined solely by the three rollers 150 the perimeters of which engage the raceway of said floating race at equiangularly spaced points.

Rollers 150 engage the outer cylindrical race 114 and the central floating race 154 under initial compression allowed by the elasticity of the materials of which the races and rollers are composed. When in the position indicated in Figs. 3, 5 and 6, in which the roller axes are parallel with the axis of race 114, and no movement is imparted to the output member by the rotation of race 114 and rollers 150, the elastic deformation due to said initial compression is least; but if rollers 150 be tilted about axes passing through the roller centers and perpendicular to planes including the axis of race 114 and the roller centers, said compression or loading is increased. This increase of compression during tilting is owing to the relative curvatures in axial planes of the raceway 156 of race 154 and of the perimeter of the roller, and to the existing relations between race 114, race 154 and roller 150, to be presently stated.

Referring for illustration to Fig. 6, it may be seen that radius of curvature R of the periphery of each roller 150, in a plane including the axis of the roller is greater than the radius of the roller and less than the radius of curvature R″ of the inside cylindrical surface,—or raceway,— of outer race 114; and the radius of curvature R′ of the raceway 156 of race 154, in a radial plane, is greater than the radius of curvature R of the periphery of roller 150. The relations specified are such that when said rollers are transmitting power the pressure between the surfaces of races and rollers increases as the resistance encountered by the output member increases, as will presently appear.

A limit to the extent of axial movement of the servo-power output member 124 is imposed by sleeve 186 and flange 128 on the output member in cooperation with the bearing 102 of supporting bracket 100 and the tubular part 104 of the power receiving member. The lower end of sleeve 186 stops downward movement of control member 124 by contact with the upper end of power receiving element 104, while upward movement of said power output member is stopped when flange member 128 thereon contacts with the lower end of said power receiving element.

As may be perceived clearly by reference to Figs. 4 to 7 and 9, a two arm roller-inclining and restoring device 160 is pivotally and frictionally associated with each roller so that the position of the arms is influenced and determined by the roller during rotation in such manner that, dependent upon the sense of rotation of the roller, one arm or the other is set automatically in such position that its extremity is engaged by an externally operated control member to be described.

Each roller-inclining and restoring device 160, shown separately in Fig. 7, comprises a principal member 162 having a flat part from opposite ends of which project arms 164, 164ª equipped with ball tips 166, and a recurved auxiliary member 168 parallel with the flat portion of the principal member 162. A circular hole 169 in the flat part of member 162, and a coaxial semi-circular notch 172 in the member 168, admit the spherical bosses 152 of the roller 150. Device 160 is shown as formed of elastic sheet metal with the member 168 spaced from the principal member 162 in such relation that when sprung over the roller and the bosses the device may pivot on the bosses and the inner surfaces of the parallel members 162 and 168 lie elastically pressed in frictional contact with the faces of the roller. Arms 164, 164ª diverge symmetrically from the flat part of member 162, as shown, the centers of the ball terminals 166 lying in a plane parallel to the flat portion of the member, and therefore parallel with the plane of rotation of the roller. The spaces between the "points" of cage member 134 afford room for rocking movements of member 160.

At its upper end,—the end opposite that which carries the cage and rollers described,—the tubular shaft 126 of servo output member 124 is connected to one arm 170 of bell crank lever fixed to the control shaft 77 near the rear end, the other arm 173 of said lever having a pivotal connection with the rearward master link 75, as indicated in Figs. 1 and 2. Another arm 173 keyed to the forward end of shaft 77 in the same angular relation as the corresponding rearward arm is pivotally connected to the forward master link 75, as indicated in Fig. 1.

A pin 174 having a spheroidal projecting part 176 is riveted or otherwise secured in the end of arm 170. The spheroidal projection 176 of the pin fits within a cylindrical hole 178 in collar 180, which is sleeved over and keyed to tubular shaft 126, as clearly shown in Fig. 3. Collar 180 is prevented from moving toward the upper end of shaft 126 by a nut 182 associated with a lock washer 184 of suitable type. It is prevented from moving toward the cage end by spacing sleeve 186 which engages a shoulder 188 on shaft 126. The control element is free to move angularly about its axis to follow the arcuate movement of arm 170 without disturbing the operation of races and rollers. Hence endwise right line movement of shaft 126 may move the arm 172 angularly by reason of the connection shown, without the interposition of linkage, and so rock the control shaft 77.

The cooperating power receiving and power transmitting elements of the servo-motor mechanism assembled in their proper relations having been described, there remain to be described the means whereby the power of said mechanism may be made effective or ineffective and otherwise controlled either automatically, as by a governor, or by the muscular efforts of an operator, or both.

External control effort may be transmitted to the rollers 150 in order to incline them through an internal control member consisting of a shaft 190 slidable within tubular output shaft 126 and a control head 192 secured to the lower end of shaft 190, below the roller cage. Shaft 190 is guided within tubular output shaft 126 by bearing enlargements 194. The upper end (the left-hand end in Fig. 3) projects from the tubular input shaft. To this end an arm 196 is secured in any suitable way, as by riveting. Arm 196 extends from the shaft at right angles, but the remote end is disposed substantially parallel with said shaft, as shown in Fig. 3, and is perforated to receive the spheroidal head 198 of a pin 200 riveted or otherwise secured to one arm 202 of a two armed rock-member freely movable angularly about the end of rockshaft 77, rearward of the arms 170 and 172, which are fixed to said rockshaft (see Figs. 1 and 2). The other arm 204 of the two-armed rock-member that is freely movable about the axis of shaft 77 has a crankpin 206 to which external force may be applied to move the slidable control member axially. The force applied to crankpin 206 may be from the muscular effort of an operator or from the speed responsive or other automatic movement of a governor or a combination of both. In Fig. 1, there is shown a link 208, universally jointed to the pin 206 on arm 204 at one end and at the other end to the bell crank lever 210, the latter being under the joint control of the operator and a speed responsive governor through mechanical linkage not fully shown since the particular external control connections utilized are not a part of the invention claimed.

The control head 192 is provided with a relatively long hub 212 the upper end of which abuts against one of the bearing enlargements 194 on shaft 190,—passing through the bore of floating race 154, as shown in Fig. 3—while the lower end abuts against a lock washer 214 backed by a nut 216; and thus the said control head is positioned on shaft 190 and held against relative endwise movement with respect to the said shaft.

Head 192 has a peripheral flange 218 projecting upward (to the left as seen in Fig. 3) toward the rollers 150 and overhanging or telescoping the member 134 of the roller cage, as shown in Figs. 3, 5 and 6. A circular groove 220 is formed in the inner surface of flange 218. This groove is preferably rectangular in cross section with chamfered edges. Groove 220 is of a depth from the chamfers to the bottom somewhat greater than half the diameter of the spherical tips 166 on the arms 164, 164ᵃ of roller-inclining and restoring device 160. One or the other of said spherical tips 166 on each device 160 is disposed in groove 220 during rotation of the rollers, as indicated in Fig. 4. If race 114 rotates in the direction of the arrow, that is, clockwise (if viewed from the upper end as in Fig. 4) as in forward driving, the rollers also rotate clockwise, and therefore that arm of each roller-inclining and restoring device 160, which is in what may be referred to as the approaching quadrant with respect to race 114, will, due to the friction between device 160 and the faces of the roller, be moved into groove 220, and the other arm (in the retreating quadrant) moved away from it. The chamfered edges of groove 220 pilot the spherical tips 166 into the groove, and since the rectangular-in-section portion of the groove is deeper than one half the diameter of the spherical tips, axial movement of the control head 192 pressing against the end of one arm only will positively incline each member 160 and with it roller 150 about an axis including the roller center and the point of contact of the roller with race 114. When inclined as described, the rollers will spiral on race 114 in an upward or downward progressing spiral, depending upon whether the control head 192 has been moved upward or downward and independent of the sense of rotation of the race. During forward driving when race 114 rotates, clockwise viewed from the upper end, as in Fig. 4, or counterclockwise viewed from the lower end as in Fig. 5, the tips 166 of arms 164 will be engaged in groove 220 of head 192, but when the race 114 is reversely rotating tips of arms 164ᵃ will be so engaged.

As illustrated in Fig. 9, a downward movement of head 192 when race 114 is rotating counterclockwise (now for convenience viewing it from the lower end) as in forward driving, will incline the rollers (as illustrated in the middle diagram of Fig. 9) so that they tend to spiral toward the lower end of the servo-mechanism and move the servo-output member downward, thus rocking control shaft 77 clockwise (as viewed in Fig. 2 from the rear) and, through links 75, collars 72 and links 73, inclining rollers 70, 70ᵃ so that they will spiral toward high speed ratio position. Movement of head 192 upward will cause the rollers 150 to spiral upward thus moving the servo-output member upward and so rocking control shaft 77 counterclockwise (as viewed from the rear) and shifting rollers 70, 70ᵃ to a lower speed ratio position.

In case the race 114 be rotating clockwise, (viewed from the lower end) that is, reversely, the arms 164ᵃ will be engaged in groove 220 of the control head 192 and arms 164 disengaged. Then, downward movement of control head will incline rollers 150 as indicated in the right hand diagram of Fig. 9. Inasmuch as race 114 is now rotating reversely or clockwise, the rollers will spiral in a downward direction, moving servo-output member downward, rocking shaft 77 clockwise (as viewed from the rear). And as the direction of rotation of races 64, 64ª and 52, 52ª has been reversed and the rollers are now being driven by races 52 and 52ª, the inclination imparted to them through links 75, reverse collars 74 and links 71 will cause them to spiral outward on races 64, 64ª and inward on races 52, 52ª to the same roller position as in high speed ratio forward. A movement of control member upward while race 114 is rotating reversely (clockwise) will incline the rollers 150 oppositely causing them to spiral upward, thus moving servo-output member upward rocking shaft 77 counterclockwise (as viewed in Fig. 2) and shifting rollers 70, 70ª oppositely so that they assume a speed ratio position in reverse, which is the same as the low speed ratio position of the rollers in forward driving.

In order to limit the amplitude of endwise movement of the internal control member, one adjustable stop, (for limiting upward movement) comprising a threaded pin 222 is arranged in a threaded hole through an arm 224 projecting from the bearing bracket that is fixed to frame member 12ª for supporting shaft 77, and another fixed stop 226 (for limiting downward movement) is formed on the other side of said arm 224. Two stop lugs 228 and 230, integral with the two-armed rock member having the arms 202 and 204, cooperate with said stops mounted on the bearing bracket. Lug 228 is adapted to contact with the end of the threaded pin 222 to limit the upward movement of the internal control member. An adjustable threaded pin 232 in stop lug 230, is adapted to contact with said fixed stop surface 226 to limit the extent of movement of said control member downward. Thus not only may the stops be adjusted to determine the amplitude of endwise movement of the internal control member, but also to vary the position of the end points of the movement with respect to a fixed point on the frame.

During the time period in which it is intended to utilize the energy of the servo-motor mechanism, it is assumed that shaft 20ª and pinion 120 are rotating continuously in one sense of rotation, or the reverse thereof. While pinion 120 is rotating counterclockwise (as viewed in Fig. 2) which has been herein indicated as the direction of rotation during forward driving, the power receiving member including race 114 is rotating counterclockwise as viewed from the right of Fig. 3. The rollers 150 are being rotated by the outer race 114 with their axes parallel with the axes of the race and with the peripheries in rolling contact with the raceways of said outer race 114 and floating race 154. In this position no movement is imparted to the power output member of the servo-mechanism. It is the position automatically assumed by the rollers when the internal control member 190, 192 is at rest.

If a governing force is applied to internal control member 190 sufficient to move it and head 192 axially, the rollers 150 will be inclined in a direction to cause the power output member to follow the control member. Assuming the rotation of race 114 to be counterclockwise (viewed from its lower end) as in forward driving, and head 192 to have been moved downward, rollers 152 will be inclined as indicated in the middle diagram of Fig. 9. Inclination in this sense tends to bring about tilting, and in so doing to bring that part of the roller which contacts with race 114 nearer the lower end of the race, or nearer the right-hand end as viewed in Fig. 6, than that part of the roller which engages floating race 154, or than the center of the roller. This tilting occurs because of the resistance to endwise movement of the power output shaft due to the load upon its upper end causing the rollers to pivot around the centers of the bosses 152 on cage element 134. In so tilting the rollers are squeezed more tightly between the races 114 and 154 by reason of the arcs of curvature and relationship between the races and rollers that have been described, thus increasing the degree of traction between races and rollers. The roller bosses 152 in contact with cage element 134 of the power output member transmit the bodily movement of the rollers, due to their described inclination, to the power output member tending to move it downward, or to the right, as viewed in Fig. 3, thus rocking shaft 77 in a direction to shift the transmission rollers to a higher speed ratio position.

While the internal control member comprising control head 192 is being shifted downward as indicated in the middle diagram of Fig. 9, the rollers contemporaneously spiral downward on race 114 and in so doing, after the control member comes to rest, becomes restored to the normal position as indicated in Figs. 5 and 6 and in the left-hand diagram of Fig. 9. This restoring movement, as will be obvious upon inspection of the diagram, is brought about by the downward right line movement of the center of each roller while the ball tip 166 of the arm 164 of device 160 is held from downward movement and pivots in groove 220 of head 192. As the roller moves downward the angle its center plane of rotation makes with a plane normal to the race axis, or that which its axis of rotation makes with the race axis, lessens until the angle becomes zero. The rollers are then in the normal position from which they have no tendency to depart until they are again inclined by an axial movement of the internal control member. It is apparent that the extent of movement of the servo-power output shaft is proportional to the extent of movement of the control member and in the same direction.

An upward movement of the control member will produce an inclination of the rollers the reverse of that shown in the middle diagram of Fig. 9, and an upward movement of the power output member.

If the sense of rotation of the mechanism is reversed, the ball tip 166 of arm 164ª of each roller-embracing device 160 will be moved into groove 220 of head 192 as indicated by dotted line illustration of one of the devices 160, in Fig. 4, and by the full line illustration in the right hand diagram of Fig. 9. As the direction of rotation is now reversed and also the inclination of the roller is reversed, when control member is moved downward it is clear the rollers will spiral downward until restoration has occurred, in the same manner as has been described with reference to forward driving as indicated in the middle diagram of Fig. 9. An upward movement of control member will initiate an upward movement of the power output member.

Whatever the sense of rotation an axial movement of the internal control member initiates movement of the power output member in the same sense of direction and of proportional extent.

We claim:

1. The combination in a servo-motor mechanism of an outer hollow race having an internal friction surface, a plurality of rollers in rolling engagement with said internal friction surface, an inner race concentric with said outer race the external surface of which is in frictional engagement with said rollers, means for applying power to rotate one of said races, an axially movable power output member in which the rollers are inclinably mounted, and control means adapted to incline the rollers about axes passing through their centers and the points of contact with the races.

2. A combination as defined in claim 1 in which one of the races is a freely floating race.

3. A combination as defined in claim 1 in which the outer race is rotated by power means.

4. A combination as defined in claim 1 in which the outer race is rotated by power means and the inner race floats freely.

5. A combination as defined in claim 1 in which the rollers are elastically compressed between the outer and inner races.

6. A combination as defined in claim 1 in which the rollers are universally mounted in the output member and elastically compressed between the races, and the races and rollers are formed of relative contours and dimensions effecting an increase of pressure between races and rollers during tilting of the rollers about an axis that passes through the roller center and is perpendicular to a radial plane including the race axis and the roller center.

7. A combination as defined in claim 1 in which the rollers are universally mounted in the power output member, the roller treads are curved in a radial plane, and in which one of the races is equipped with a plain cylindrical raceway and the other with a raceway concave in a radial plane, the radius of curvature in a radial plane of the concave raceway being longer than the radius of curvature in a radial plane of the roller tread.

8. A combination as defined in claim 1 with stop means to limit the range of movement of the power output member.

9. In a servo-motor mechanism the combination of a rotatable hollow power receiving member and means for driving it, said power receiving member comprising a race having an internal raceway, a race concentrically disposed within the raceway of the power receiving member, a power output member extending axially through said power receiving member, rollers rotatably mounted in said power output member and free to incline therein about axes passing through their centers and points of contact with said races, and externally operable control means adapted to hold the rollers tracking in circular paths on the raceways or to incline them so as to track in spiral paths on the raceways, said control means comprising an axially movable member connected with said rollers.

10. In a servo-motor mechanism the combination of a rotatable hollow power receiving member comprising an outer race having an internal cylindrical raceway, an inner race concentrically disposed within said cylindrical raceway, and having a raceway concaved in a radial plane, a power output member extending axially through said power receiving member, rollers universally pivoted in said power output member and in rolling contact with said races, the treads of said rollers being curved in a radial plane on a radius greater than the roller radius and less than the radius of curvature of the inner race in a radial plane, and control means for inclining said rollers about axes passing through the roller centers and their points of contact with the races.

11. In a servo-motor mechanism the combination of a rotatable race with power means to rotate it in either sense of rotation, a power output member movable axially of said race, a roller mounted in the output member, means for elastically forcing the roller into rolling contact with the race, an axially movable control member, a roller inclining device pivoted concentrically with respect to the axis of rotation of the roller, said device bearing frictionally on the roller and having oppositely extending arms, and means on the control member arranged to engage either arm.

12. A combination as defined in claim 11 in which the control member is equipped with a head having a groove disposed in position to receive the end of one arm or the other of the roller inclining device dependent upon the sense of rotation of the roller.

13. A combination as defined in claim 11 in which the axially movable control member comprises a head having a flange provided with an annular internal groove normally overhanging the ends of the arms of the roller inclining device.

14. In race and roller mechanism of the class described, a clip-like roller-inclining device composed of elastic material having two members adapted to receive a roller between them and bear frictionally upon the faces thereof, means to support the device so that it may pivot about the axis of rotation of the roller, arms extending oppositely from one of the members, said arms having ends adapted to be selectively engaged by a control member.

15. A roller having a spherical boss projecting centrally from each face of the roller, a clip-like roller-inclining device, consisting of two elastic members having registering bearing openings fitting over the bosses, one of said members having oppositely projecting arms the end of one or the other of which is adapted to be selectively engaged by a control member.

16. In a servo-motor mechanism the combination of a reversible rotatable power receiving member having an axial opening therethrough and a race, a race concentric therewith, a longitudinally perforated power output member movable axially in the opening of the power receiving member, said power output member having a cage with spaced members; rollers mounted with three degrees of freedom in said cage, means for preventing angular movement of the rollers about the center of said cage; a roller inclining device in frictional engagement with each roller and tending to rotate with the roller; arms extending oppositely from said device; a control member axially movable within the power output member, said control member having a head provided with a groove arranged in position to receive the end of one or the other of said arms depending on the sense of rotation of the roller.

WINFIELD D. GOVE.
JOHN O. ALMEN.